US008246383B2

(12) United States Patent
Schmidt et al.

(10) Patent No.: US 8,246,383 B2
(45) Date of Patent: Aug. 21, 2012

(54) SEALED CONNECTORS FOR PORTABLE ELECTRONIC DEVICES

(75) Inventors: Mathias Schmidt, Mountain View, CA (US); Eric Jol, San Jose, CA (US)

(73) Assignee: Apple Inc., Cupertino, CA (US)

( * ) Notice: Subject to any disclaimer, the term of this patent is extended or adjusted under 35 U.S.C. 154(b) by 36 days.

(21) Appl. No.: 12/728,171

(22) Filed: Mar. 19, 2010

(65) Prior Publication Data

US 2011/0230074 A1    Sep. 22, 2011

(51) Int. Cl.
*H01R 13/648* (2006.01)
(52) U.S. Cl. .................................. 439/607.35; 439/587
(58) Field of Classification Search .................. 439/271, 439/587, 736, 607.35–607.4, 946
See application file for complete search history.

(56) References Cited

U.S. PATENT DOCUMENTS

| 2,761,111 | A | * | 8/1956 | Klostermann ................. 439/271 |
| 3,221,292 | A | * | 11/1965 | Swanson et al. ................ 439/589 |
| 3,816,641 | A | * | 6/1974 | Iversen ........................... 174/76 |
| 3,850,495 | A | * | 11/1974 | Glover ............................ 439/273 |
| 4,082,398 | A | * | 4/1978 | Bourdon et al. ................ 439/595 |
| 4,387,945 | A | | 6/1983 | MacAvoy |
| 4,480,151 | A | | 10/1984 | Dozier |
| 4,657,323 | A | * | 4/1987 | Erbe ................................ 439/83 |
| 5,108,317 | A | | 4/1992 | Beinhaur et al. |
| 5,236,375 | A | | 8/1993 | Kachlic |
| 5,356,304 | A | | 10/1994 | Colleran |
| 5,595,504 | A | | 1/1997 | Muller |
| 5,823,824 | A | | 10/1998 | Mitamura et al. |
| 6,368,130 | B1 | | 4/2002 | Fukuda |
| 6,572,416 | B2 | * | 6/2003 | Patwardhan et al. ........... 439/736 |
| 6,601,296 | B1 | * | 8/2003 | Dailey et al. ...................... 29/848 |
| 6,638,090 | B2 | | 10/2003 | Wakata |
| 6,776,660 | B1 | | 8/2004 | Kubota et al. |
| 6,913,493 | B2 | * | 7/2005 | Berg et al. ....................... 439/736 |
| 6,953,357 | B2 | | 10/2005 | Fukushima et al. |
| 2008/0032540 | A1 | | 2/2008 | Fukushima |

(Continued)

FOREIGN PATENT DOCUMENTS

JP    7142116 A    6/1995

(Continued)

OTHER PUBLICATIONS

Wang, Erik L., et al. U.S. Appl. No. 12/119,986, filed May 13, 2008.

(Continued)

*Primary Examiner* — Thanh Tam Le
(74) *Attorney, Agent, or Firm* — Treyz Law Group; Jason Tsai; G. Victor Treyz

(57) ABSTRACT

A portable electronic device may have a sealed connector secured within a device housing. The sealed connector may have a metal shell. A plastic contact housing may be insert molded within the shell. Conductive signal contacts may be laterally spaced in the contact housing. An elastomeric gasket may be assembled or compression molded onto the metal shell. Left and right metal brackets may be welded onto the metal shell to moisture-seal latch windows. A water-resistant sealing layer may be attached to the bottom plate of the metal shell to moisture-seal alignment rail windows. The sealed connector may be pressed against the device housing to place the gasket in a compressed state. The connector may be secured to the device housing by screwing down the metal brackets to a circuit board assembled within the housing while the gasket is in the compressed state.

18 Claims, 14 Drawing Sheets

U.S. PATENT DOCUMENTS

2008/0166905 A1 7/2008 Murphy et al.
2008/0299837 A1 12/2008 Long et al.

FOREIGN PATENT DOCUMENTS

WO 2009537778 4/2009

OTHER PUBLICATIONS

Ayala, Enrique, et al. U.S. Appl. No. 12/142,744, filed Jun. 19, 2008.
Mittleman, Adam D., et al. U.S. Appl. No. 12/113,910, filed May 1, 2009.
Jol, Eric. U.S. Appl. No. 12/571,255, filed Sep. 30, 2009.

* cited by examiner

SEALED CONNECTORS FOR PORTABLE ELECTRONIC DEVICES

BACKGROUND

This relates generally to sealed connectors, and more particularly, to moisture-sealed connectors for electronic devices such as portable electronic devices.

Handheld electronic devices and other portable electronic devices are becoming increasingly popular. Examples of handheld devices include handheld computers, media players, cellular telephones, and hybrid devices that include the functionality of multiple devices of this type.

Portable electronic devices such as handheld electronic devices may contain complex electronic circuitry in a compact area. Electronic components such as memory, processors, and other circuits are highly sensitive to moisture. Too much moisture can create unintended low resistance connections between nodes that are meant to be at different voltages making the circuits perform unpredictably or malfunction. Circuits may also be adversely affected by exposure to dust or other contaminants. Because portable electronic devices may not always be operated in a controlled environment, they may be more prone to be exposed to moisture, dust, or other contaminants than stationary electronic devices.

Portable electronic devices often have connectors that can mate with external mating connectors. A connector in a conventional portable electronic device may be constructed by pressing pins into holes in a plastic contact housing. The plastic contact housing is then fit into a stainless steel shell. The plastic housing with the stainless steel shell can be mounted within a port opening in the housing of the portable electronic device. A conventional connector formed in this way has multiple junctions that are not fully sealed. This is because the interfaces in these junctions are only held in contact with each other by a friction fit. Friction-fit junctions allow liquids and other contaminants to intrude into the interior of the housing.

One friction-fit junction that may be present is the interface between the connector pins and the plastic contact housing. Another friction-fit junction that may be present is the interface between the plastic contact housing and the stainless steel shell. Yet another friction-fit junction that may be present is the interface between the stainless steel shell and the housing of the portable electronic device. The stainless steel shell has male plug latch windows (holes) and alignment rails that are used to form a connection with the external mating connector. The process of forming the alignment rails creates alignment rail windows (holes). The friction-fit interfaces, the latch windows, and the alignment rail windows are not sealed and represent possible conduits through which undesirable moisture and debris can infiltrate the portable electronic device.

It would therefore be desirable to be able to provide electronic devices with connectors that can more effectively prevent moisture infiltration.

SUMMARY

Electronic devices may be provided with sealed connectors. A moisture-sealed connector can help prevent moisture infiltration into a device interior.

A portable electronic device may have a sealed connector that is used as a data port. The sealed connector may be adapted to connect to a mating connector such as a plug on a cable or accessory. The connector may have contact leads ("contacts"). A shot of thermoplastic material may be injected within a metal shell using an insert molding process to form a plastic contact housing that is molded around the contact leads. There may be multiple (e.g., 30) laterally spaced contacts in a connector. The interface between the metal shell and the thermoplastic contact housing is sealed by mechanical bonds.

In one suitable arrangement, a U-shaped silicone gasket may be assembled on the metal shell to seal top and side portions of the metal shell. Pressure sensitive adhesive (PSA) may be applied to a bottom plate of the metal shell to attach the sealed connector to the device housing.

In another suitable arrangement, a silicone gasket may be used to seal the top, bottom, and side portions of the metal shell. The silicone gasket may be molded directly onto the metal shell using a compression molding process and may have the shape of a rectangular ring.

The sealed connector may have latch windows. The latch windows may be sealed using metal brackets with corresponding latch cups that are welded directly to the metal shell. The latch windows may also be sealed using elastomeric sealing members (e.g., the sealing members may be integral parts of a U-shaped silicone gasket).

The sealed connector may have alignment rail windows. The alignment rail windows may be sealed by attaching a water-resistant sealing layer to the bottom plate of the metal shell to seal the alignment rail windows against moisture.

The connector may be mounted within a device housing. When assembled, the sealing member in the connector may press against the walls of the device housing to compress the gasket and to seal the interface between the connector and the device housing.

A printed circuit board within the device may have screw holes. The connector may have left and right metal brackets. The left and right metal brackets may have screw holes that correspond to the screw holes in the circuit board. Corresponding screws may be inserted into the screw holes to secure the sealed connector within the device housing while the gasket is in a compressed state.

Further features of the connector, its nature and various advantages will be more apparent from the accompanying drawings and the following detailed description.

DETAILED DESCRIPTION

The present invention relates to sealed connectors for electronic devices.

The electronic devices may be portable electronic devices such as laptop computers or small portable computers of the type that are sometimes referred to as ultraportables. Portable electronic devices may also be somewhat smaller devices. Examples of smaller portable electronic devices include wrist-watch devices, pendant devices, headphone and earpiece devices, and other wearable and miniature devices. With one suitable arrangement, the portable electronic devices may be wireless electronic devices.

The wireless electronic devices may be, for example, handheld wireless devices such as cellular telephones, media players with wireless communications capabilities, handheld computers (also sometimes called personal digital assistants), remote controllers, global positioning system (GPS) devices, and handheld gaming devices. The wireless electronic devices may also be hybrid devices that combine the functionality of multiple conventional devices. Examples of hybrid portable electronic devices include a cellular telephone that includes media player functionality, a gaming device that includes a wireless communications capability, a cellular telephone that includes game and email functions, and a portable device that receives email, supports mobile telephone calls, has music player functionality and supports web browsing. These are merely illustrative examples.

Figure 1:
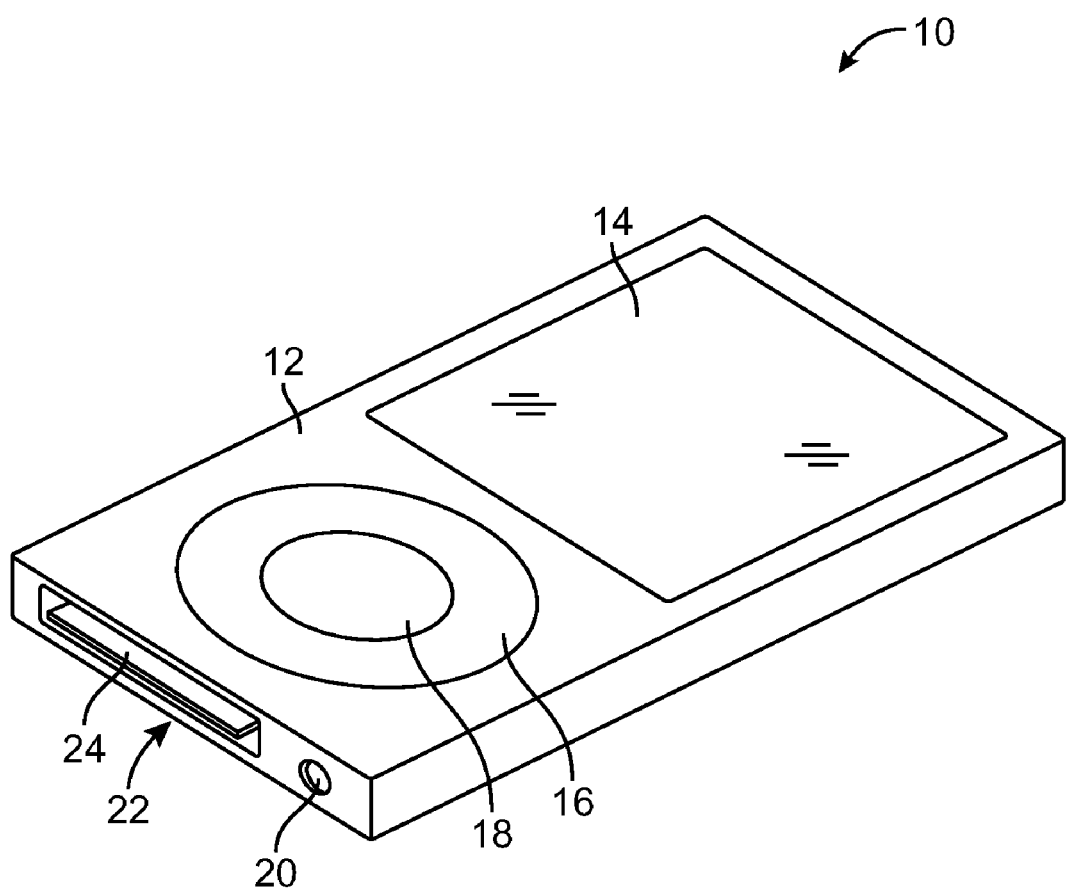
FIG. 1 is a perspective view of an illustrative portable electronic device in accordance with an embodiment of the present invention.

An illustrative portable electronic device in accordance with an embodiment of the present invention is shown in FIG. 1. Device 10 of FIG. 1 may be, for example, a handheld electronic device that supports handheld computing device functions such as music player functionality, games, internet browsing, email and calendar functions, cellular telephone and data functions, local wireless communications capabilities (e.g., IEEE 802.11 and Bluetooth®), etc.

Device 10 may have device housing 12. Device housing 12, which is sometimes referred to as a case, may be formed from any suitable materials including, plastic, glass, ceramics, metal, or other suitable materials, or a combination of these materials.

Device housing 12 may have a display such as display 14 that is formed on a top face of housing 12. Display 14 may be a liquid crystal display (LCD), an organic light emitting diode (OLED) display, an electronic ink display, or any other suitable display. The outermost surface of display 14 may be formed from one or more plastic or glass layers.

In the example of FIG. 1, display screen 14 is shown as being mounted on the front face of handheld electronic device 10, but display screen 14 may, if desired, be mounted on the rear face of handheld electronic device 10, on a side of device 10, on a flip-up portion of device 10 that is attached to a main body portion of device 10 by a hinge (for example), or using any other suitable mounting arrangement.

If desired, touch screen functionality may be integrated into display 14 or may be provided using a separate touch pad device. Display screen 14 is merely one example of an input-output device that may be used with electronic device 10. If desired, electronic device 10 may have other input-output devices. Suitable user input interface devices for electronic device 10 include buttons (e.g., alphanumeric keys, power on-off, power-on, power-off, and other specialized buttons, etc.), a touch pad, pointing stick, or other cursor control device, a microphone for supplying voice commands, or any other suitable interface for controlling device 10. For example, electronic device 10 may have user input interface devices such as touch pad 16 and button 18. In one suitable arrangement, touch pad 16 may surround button 18 (see, e.g., FIG. 1). Button 18 may be, for example, a menu button.

A user of electronic device 10 may supply input commands using user input interface devices such as touch screen 14, touch pad 16, and button 18. Although shown as being formed on the top face of electronic device 10 in the example of FIG. 1, buttons such as button 18, touch pad 16, and other user input interface devices may generally be formed on any suitable portion of device 10.

Device 10 may have audio and video jacks (e.g., jack 20) that allow device 10 to interface with external components.

Data ports in device 10 such as port 22 may include power pins to recharge a battery within device 10 or to operate device 10 from a direct current (DC) power supply, data pins to exchange data with external components such as a personal computer or peripheral, audio-visual jacks to drive headphones, a monitor, or other external audio-video equipment. Port 22 may be used as an input-output port (e.g., when connecting device 10 to a mating dock connected to a computer or other electronic device). Port 22 may have a sealed connector such as moisture-sealed data port connector 24. Connector 24 may be a 30-pin data port female connector (e.g., a jack) that receives a mating 30-pin data port male connector (e.g., a plug). Port 22 and sealed connector 24 may sometimes be referred to as a dock connector. Connector 24 may be sealed (e.g., moisture-sealed) sufficiently with respect to the walls of housing 12 to prevent ingress of moisture, dust, dirt, or other debris that could cause electronic device 10 to malfunction.

Figure 2:
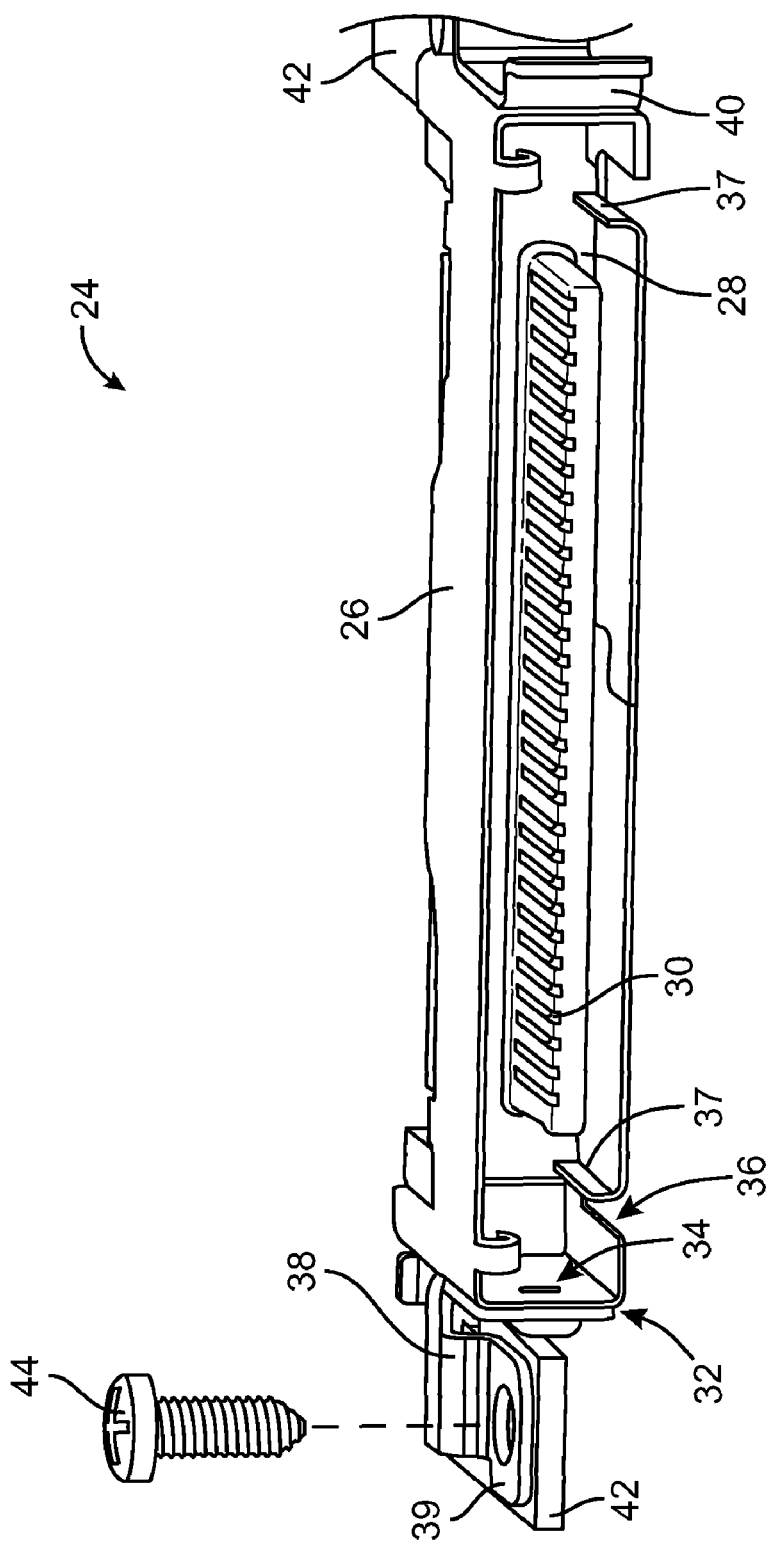
FIG. 2 is a perspective view of an illustrative sealed connector showing potential ingress areas in accordance with an embodiment of the present invention.

FIG. 2 is a perspective view of sealed connector 24. Sealed connector 24 may include conductive signal contacts such as conductive signal contacts 30 (e.g., contact pins or contact leads) formed in a plastic contact housing such as plastic contact housing 28. Plastic contact housing 28 may serve to insulate contacts 30 and to prevent short-circuit current from flowing between contacts 30. There may be thirty laterally spaced contacts formed in plastic contact housing 28 (as an example).

Plastic contact housing 28 may be surrounded by a metal shell such as metal shell 26. Metal shell 26 may have parallel top and bottom plates that are connected by left and right side portions. Metal shell 26 may have latch windows (holes) such as latch windows 34 on the left and right side portions of shell 26 and alignment rail windows (holes) such as alignment rail windows 36 on the bottom plate of shell 26. Latch windows 34 are openings that allow the mating connector to secure itself to connector 24. Alignment rail windows 36 are byproducts of alignment rails 37 that are bent up from the bottom plate of metal shell 26. The alignment rails may provide physical guidance for the mating connector.

Connector 24 may be placed within device housing 12. Potential ingress areas include gaps between contacts 30 and plastic contact housing 28 (sometimes referred to herein as contact stitching gaps), gaps between metal shell 26 and plastic contact housing 28 (sometimes referred to herein as shell-to-insulator gaps), gaps between metal shell 26 and housing 12 (sometimes referred to herein as shell-to-housing gaps 32), latch windows 34, and rail alignment windows 36. These potential ingress areas represent locations associated with connector 24 where moisture could potentially enter device 10. It is therefore generally desirable to provide ways of moisture-sealing these ingress areas.

Mounting structures such as left metal bracket 38 and right metal bracket 40 may be attached to metal shell 26. Brackets 38 and 40 may, for example, be welded to metal shell 26. Brackets 38 and 40 may include holes such as screw holes (see, e.g., hole 39). The screw holes may be positioned over a substrate such as printed circuit board (PCB) 42. Circuit board 42 may be a rigid PCB, a flexible circuit board (e.g., a flex circuit), a rigid-flex circuit board, or other types of substrate. Screws such as screw 44 may be used to secure connector 24 to circuit board 42 that is mounted within device housing 12.

Sealed connector 24 may be formed using an injection molding process such as an insert molding process. Injection molding is a manufacturing process for producing parts from thermoplastic materials. Suitable thermoplastics for injection molding can be formed from polymers that assume a liquid (moldable) state when heated and that solidify to a solid plastic state when sufficiently cooled. Thermoplastic materials that may be used for forming connector 24 may include polyethylene, polypropylene, and other polymers suitable for use in injection molding techniques.

Figure 3:
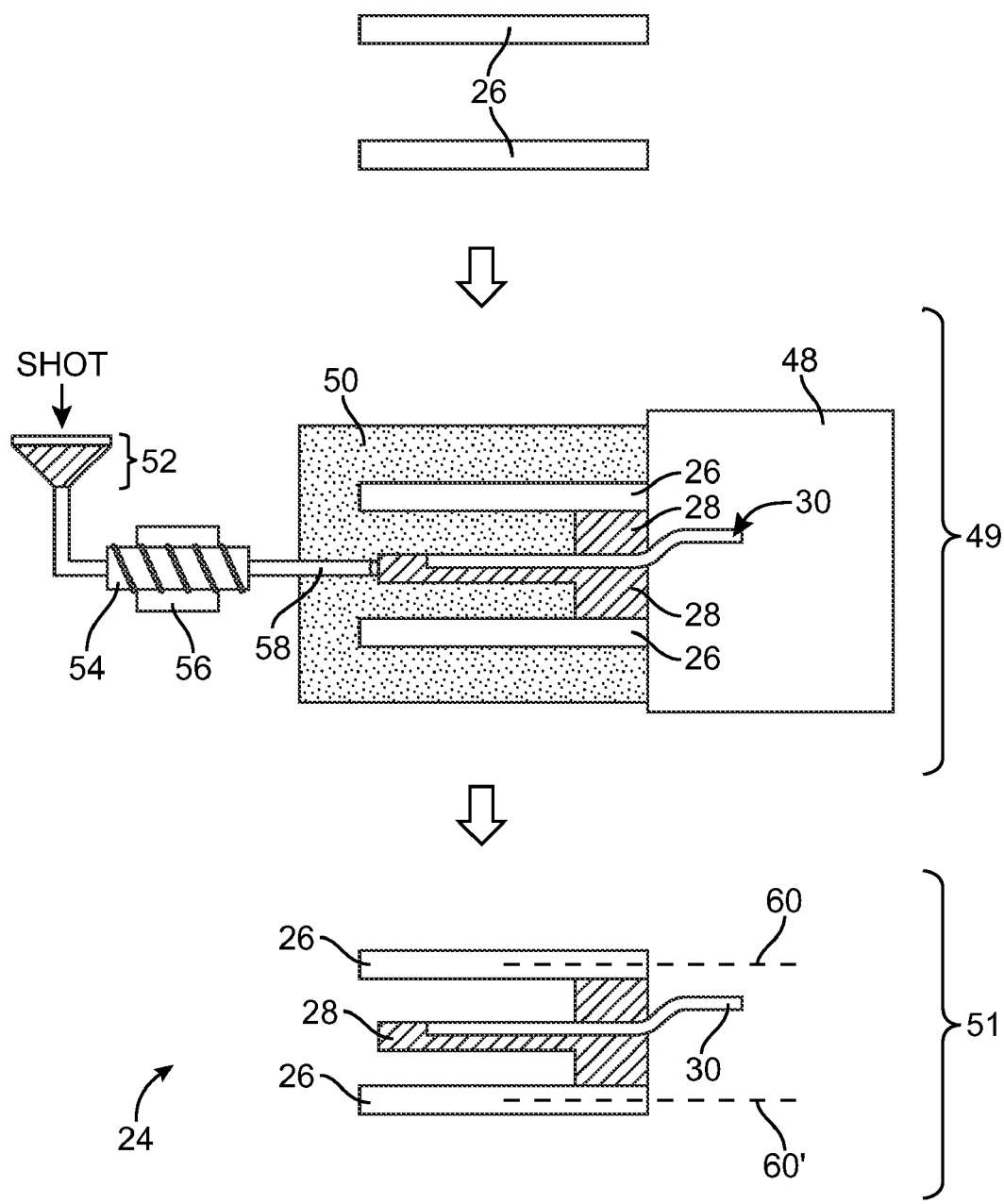
FIG. 3 is a diagram showing how an illustrative sealed connector may be formed with conductive signal contacts in place using an insert molding tool in accordance with an embodiment of the present invention.

FIG. 3 shows cross-sectional side views of an injection molding system during steps involved in forming an illustrative connector using an insert molding process. A connector that is formed in this way may have metal shell 26. Metal shell 26 may be formed from a thin sheet of stainless steel or any suitable metal or material.

At step 49, shell 26 and pins 30 may be held in place by holding structure 48. Pins 30, which may also sometimes be referred to as contact leads or contacts, may each be formed from a thin piece of conductor (e.g., copper, plated copper, brass, or any suitable metal). Mold 50 may be placed around shell 26 so that mold 50 forms a mold cavity that is inside shell 26 and that surrounds pins 30. A shot of pelletized thermoplastic material (e.g., thermoplastic granules or "resin") may be added to hopper 52. The material may be gravity fed into a screw-type plunger 54 (or an injection ram) that is heated by heating unit 56. The heat generated by unit 56 and the rotation of the screw in plunger 54 result in elevated temperatures and a shearing action on the thermoplastic pellets that causes the pellets to melt into molten plastic. Screw rotation in plunger 54 may push the molten plastic towards the mold cavity. Mold 50 may have an opening through which nozzle 58 may be inserted to connect with the mold cavity. Plunger 54 may inject the molten plastic into the mold cavity through nozzle 58. The molten plastic may be injected with a high enough pressure to completely fill the mold cavity.

When the mold cavity has been completely filled, the molten plastic may be cooled by running water through channels in mold 50. The plastic that solidifies within the mold cavity forms plastic contact housing (insulator) 28 that molds around pins 30. This process is referred to as insert molding, because thermoplastic is injected into a mold cavity around an insert piece (i.e., pin 30). At the completion of the cooling cycle, mold 50 may be released. Metal shell 26 with the inserted-molded plastic contact housing may be ejected (step 51).

The top and bottom plates of metal shell 26 may be parallel to axes 60 and 60' respectively. It may be desirable to form the top and bottom plates of shell 26 to be slightly angled from one another to facilitate the release of mold 50. For example, axes 60 may be drafted 0.25 degrees from axes 60'. Any other desirable angle may be used. Axes 60 and 60' may be parallel, if desired.

A tightly sealed mechanical bond may be formed when the insert structures are formed of a different material than the resin. For example, a mechanical bond may be formed between metal shell 26 (e.g., a metal casing) and plastic contact housing 28 (e.g., a plastic housing). To achieve a well-formed mechanical bond, metal shell 26 may be provided with a surface capable of retaining the encased plastic housing under normal conditions (e.g., normal operating temperatures and stresses). The mechanical bond between metal shell 26 and plastic contact housing 28 and the mechanical bond between plastic contact housing 28 and pins 30 (e.g., the metal insert pieces of the connector) may form interfaces that sufficiently seal the shell-to-insulator gaps and the contact stitching gaps from moisture, respectively.

Figure 4:
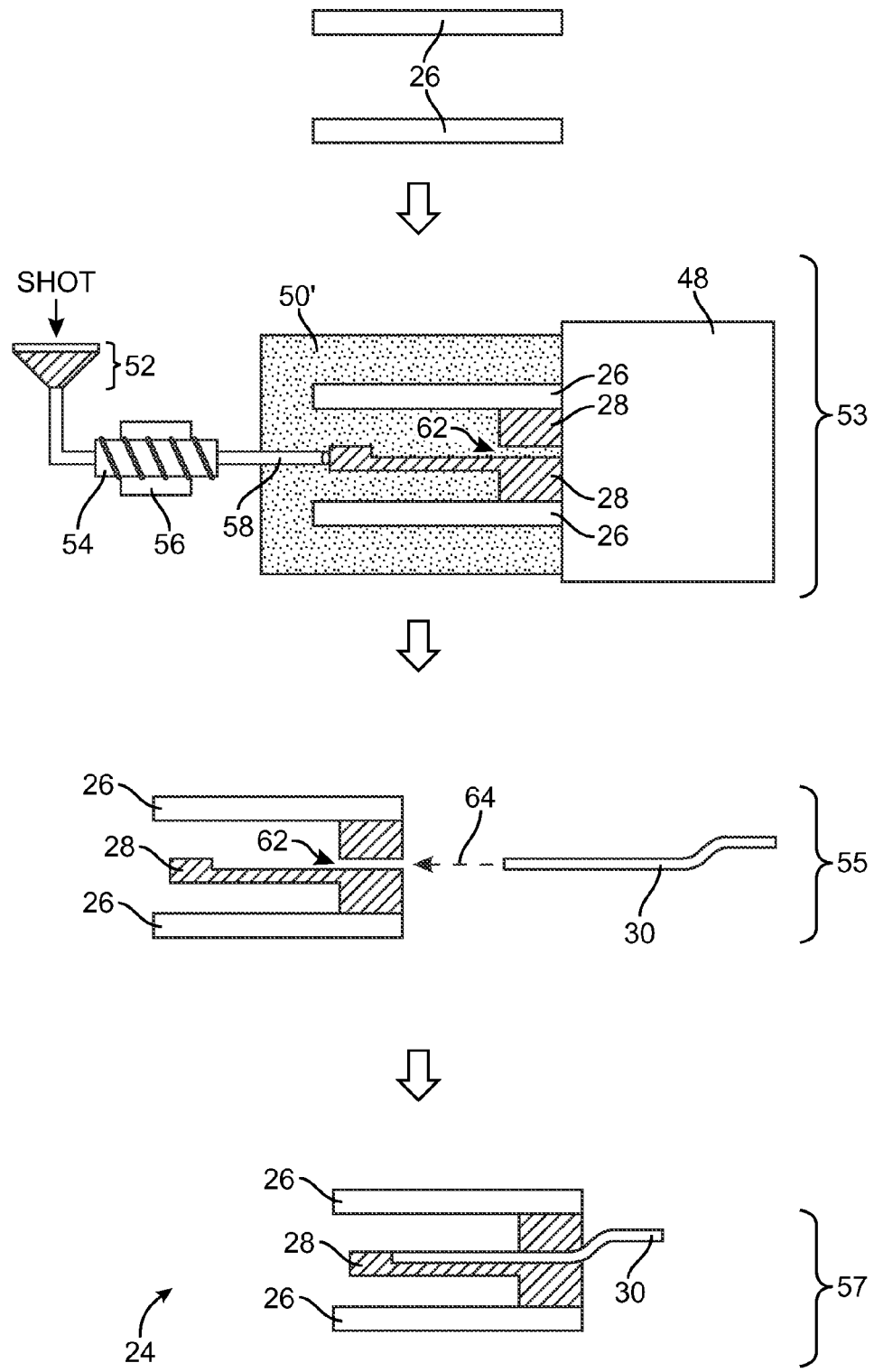
FIG. 4 is a diagram showing how an illustrative sealed connector may be formed with contact stitching holes for conductive signal contacts using an insert molding tool in accordance with an embodiment of the present invention.

Another suitable approach for forming connector 24 is shown in FIG. 4. At step 53, metal shell 26 may be held in place by holding structure 48. Mold 50' may be placed around shell 26 so that mold 50' forms a mold cavity that is inside shell 26 and forms contact stitching holes such as contact stitching holes 62. Contact stitching holes 62 are openings through which contacts 30 may be inserted at a later processing step.

A shot of pelletized thermoplastic material (e.g., thermoplastic granules or "resin") may be injected into the mold cavity formed by mold 50' to form plastic contact housing 28 as described in connection with FIG. 3.

Mold 50' may subsequently be released. Contacts 30 may be inserted into contact stitching holes 62 manually or automatically with suitable assembly equipment (step 55). Inserting contacts 30 into holes 62 in this way may form tight friction-fit interfaces between contacts 30 and plastic contact housing 28. Sealing the contact stitching gaps using this approach may be acceptable provided that the risk for liquid ingress through the contact stitching gaps is relatively low compared to the risk for moisture ingress through the shell-to-insulator gaps.

In summary, the mechanical bond between metal shell 26 and plastic contact housing 28 and the friction-fit between contacts 30 and plastic contact housing 28 may form interfaces that satisfactorily seal the shell-to-insulator gaps and the contact stitching gaps from moisture, respectively (step 57).

Figure 5:
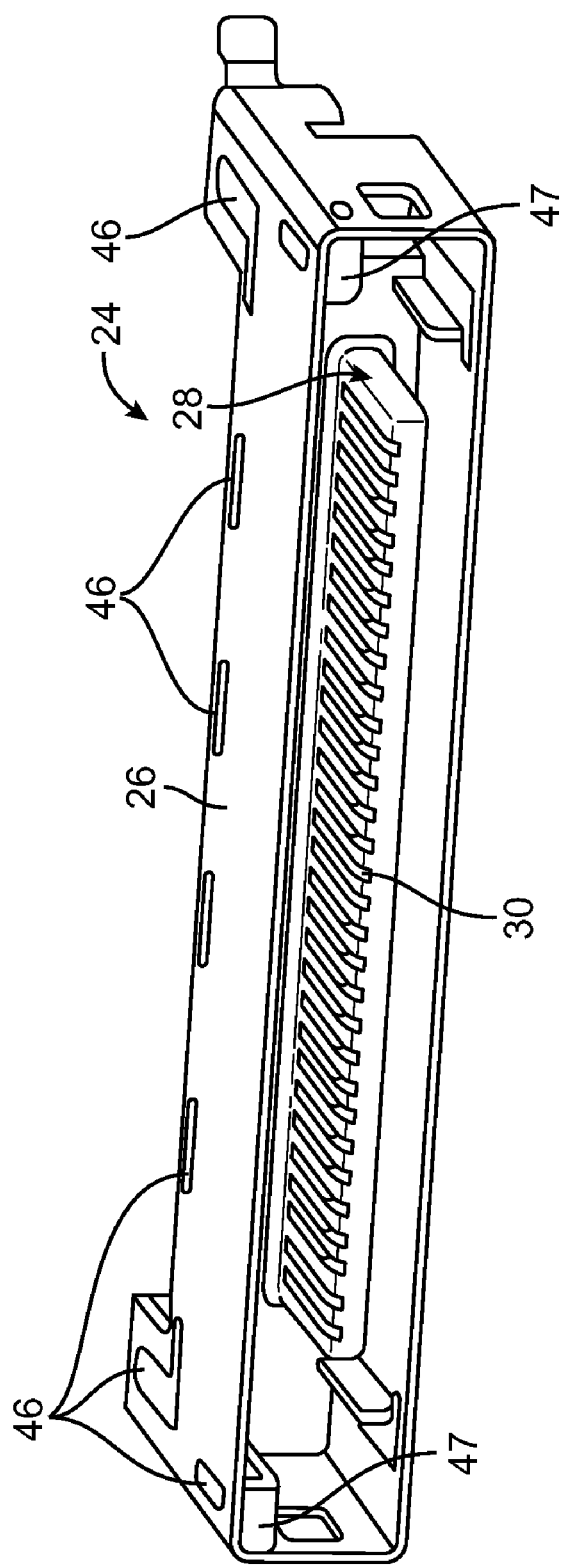
FIG. 5 is a perspective view of an illustrative sealed connector showing a metal shell with through holes that are filled with plastic during an insert molding process in accordance with an embodiment of the present invention.

Metal shell 26 may have through holes such as through holes 46, as shown in FIG. 5. Through holes 46 may be filled with plastic material during the insert molding process that forms plastic housing 28. The portions of plastic material that fill through holes 46 may be used for shell-to-insulator retention (e.g., to provide mechanical support for the placement of plastic contact housing 28 within metal shell 26). Reverse mating structures such as reverse mating structures 47 may also be formed during the insert molding process. Reverse mating structures 47 may be used to ensure proper connection with the mating connector.

Shell-to-housing gaps 32 (see, e.g., FIG. 2) may present relatively high risks for moisture ingress. Sealed connector 24 may be assembled within device housing 12 and may be secured against the walls of port (opening) 22 to close gaps 32. For example, elastomeric sealing structure (e.g., a silicone gasket) may be assembled onto metal shell 26 to seal shell-to-housing gaps 32.

Figure 6:
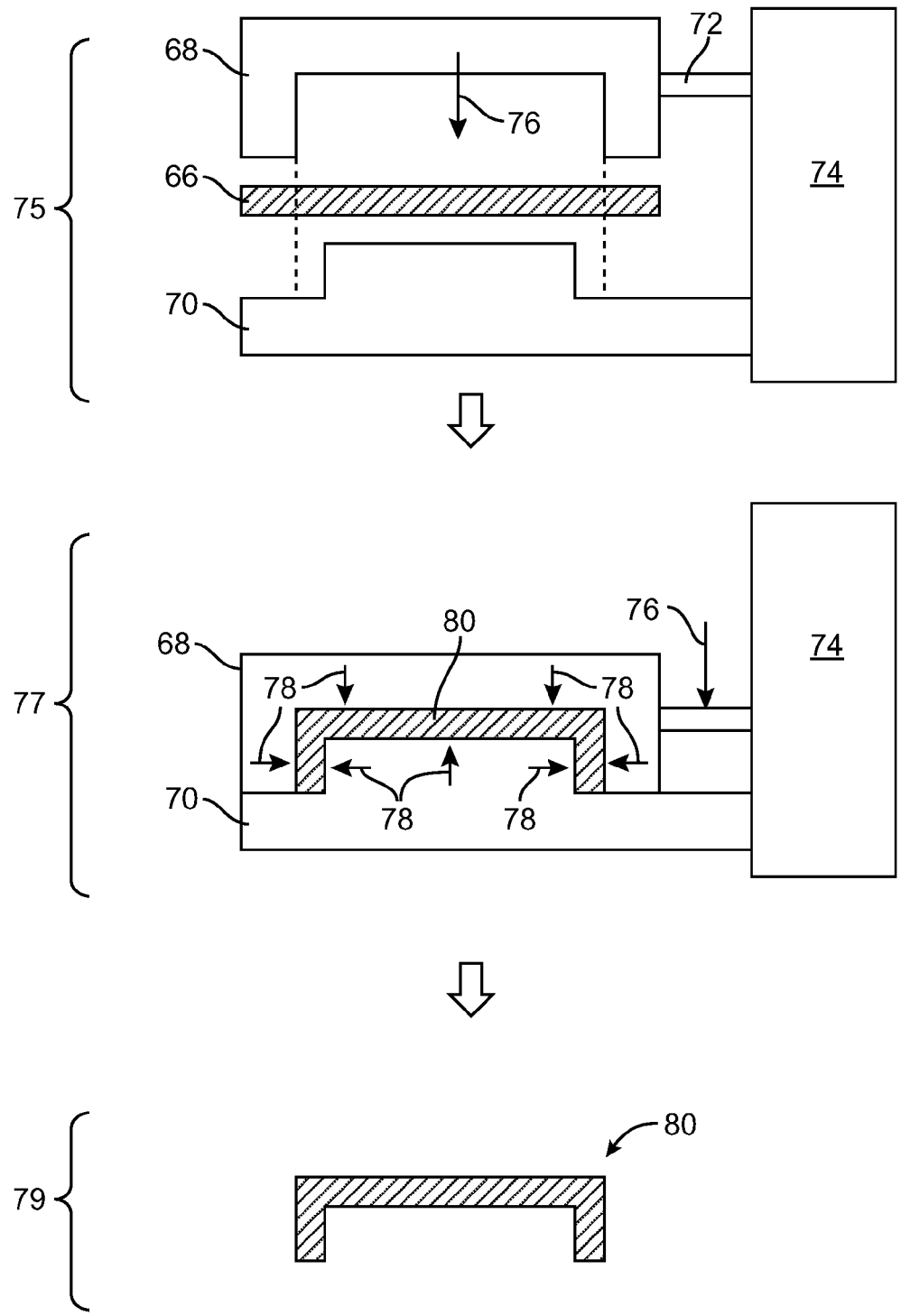
FIG. 6 is a diagram showing how a U-shaped gasket may be formed using a compression molding tool in accordance with an embodiment of the present invention.

An elastomeric sealing structure such as U-shaped gasket 80 may be formed using a compression molding process, as shown in FIG. 6. At step 75, a layer of silicone such as layer 66 may be placed between upper molding structure 68 and lower molding structure 70. Layer 66 may be formed from silicone, rubber, or other suitable elastomeric (compressive) materials. Lower molding structure 70 may be attached to a computer-controlled positioning structure such as control structure 74. Upper molding structure 70 may be attached to control structure 74 through support member 72. Control structure 74 may have motors, gears, or other mechanical equipment that moves support member 72 and upper molding structure 68 downwards in the direction of arrow 76.

At step 77, control structure 74 may move upper molding structure 68 downwards so that upper molding structure 68 comes in contact with lower molding structure 70. Lowering structure 68 in this way may cause layer 66 to bend into an upside down "U" configuration (when viewed from the front). Upper and lower molding structures 68 and 70 may compressively mold layer 66 into U-shaped gasket 80. Once molded into a U shape, gasket 80 will generally retain its shape upon release of the molding structures (step 79). Heat need not be required in the compression molding process.

Figure 7:
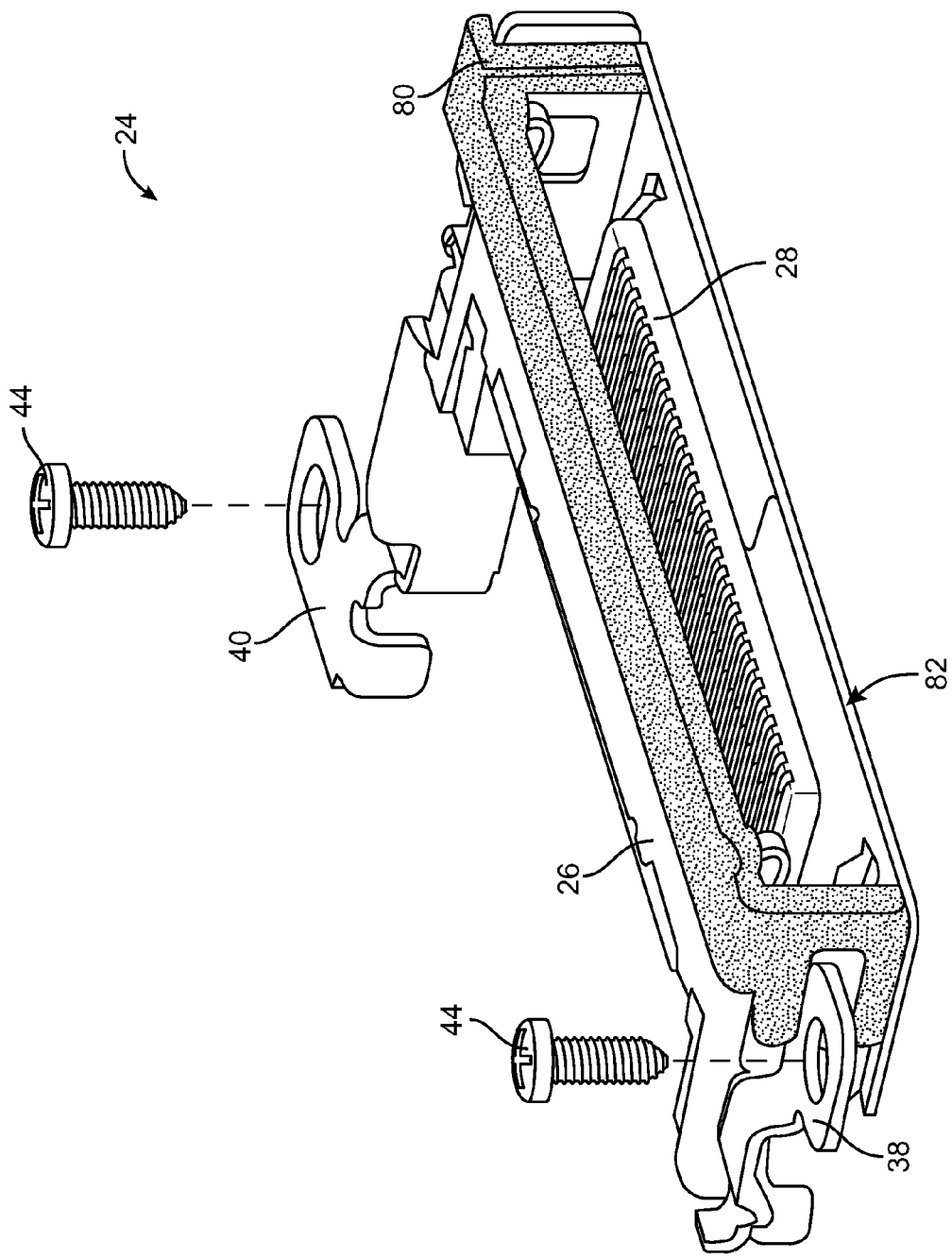
FIG. 7 is a perspective view of an illustrative sealed connected that is moisture-sealed with a U-shaped gasket of the type shown in FIG. 6 in accordance with an embodiment of the present invention.

Gasket 80 may be assembled onto metal shell 26 to create a seal along the top and side portions of shell 26, as shown in FIG. 7. Left and right brackets 38 and 40 may have screw holes through which screws 44 may be inserted to secure sealed connector 24 within device housing 12. The bottom of shell 26 may be covered with pressure sensitive adhesive (PSA) material such as PSA 82. PSA 82 is an adhesive that is activated upon an applied pressure. PSA 82 may be used to create a seal along the bottom side of metal shell 26 when metal shell 26 is secured within housing 12.

Figure 8:
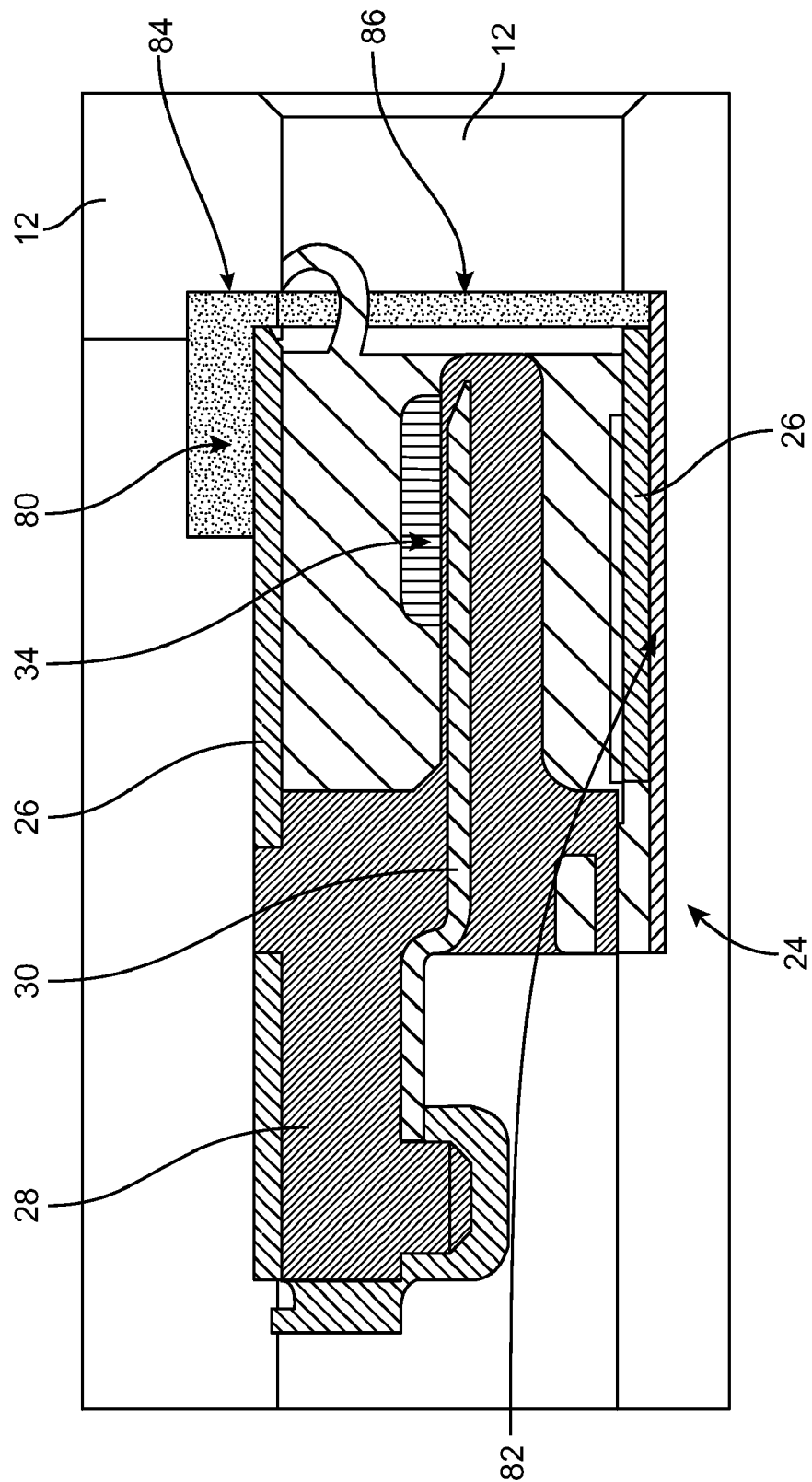
FIG. 8 is a cross-sectional side view of the illustrative sealed connector of FIG. 7 in accordance with an embodiment of the present invention.

FIG. 8 is a cross-sectional side view showing sealed connector 24 mounted within housing 12. A top portion of gasket 80 that lines the top of shell 26 may be pushed against corresponding surface 84 of device housing 12 to compress gasket 80 between the connector and the device housing. Side portions of gasket 80 that line the sides of shell 26 may be pushed against corresponding surfaces 86 of device housing 12 to compress gasket 80. PSA 82 may be activated while gasket 80 is in the compressed state to seal the bottom portion of shell 26. Sealed connector 24 may be screwed down by screws 44 (see, e.g., FIG. 7) when gasket 80 and PSA 82 are in the compressed state. In the compressed state, gasket 80 may seal shell-to-housing gaps 32 (see, e.g., FIG. 2) to prevent moisture from entering the housing. Gasket 80 is merely an example of an elastomeric sealing structure for sealing connector 24. Sealing structures of another type and shape may be used to seal gaps 32, if desired.

Figure 9:
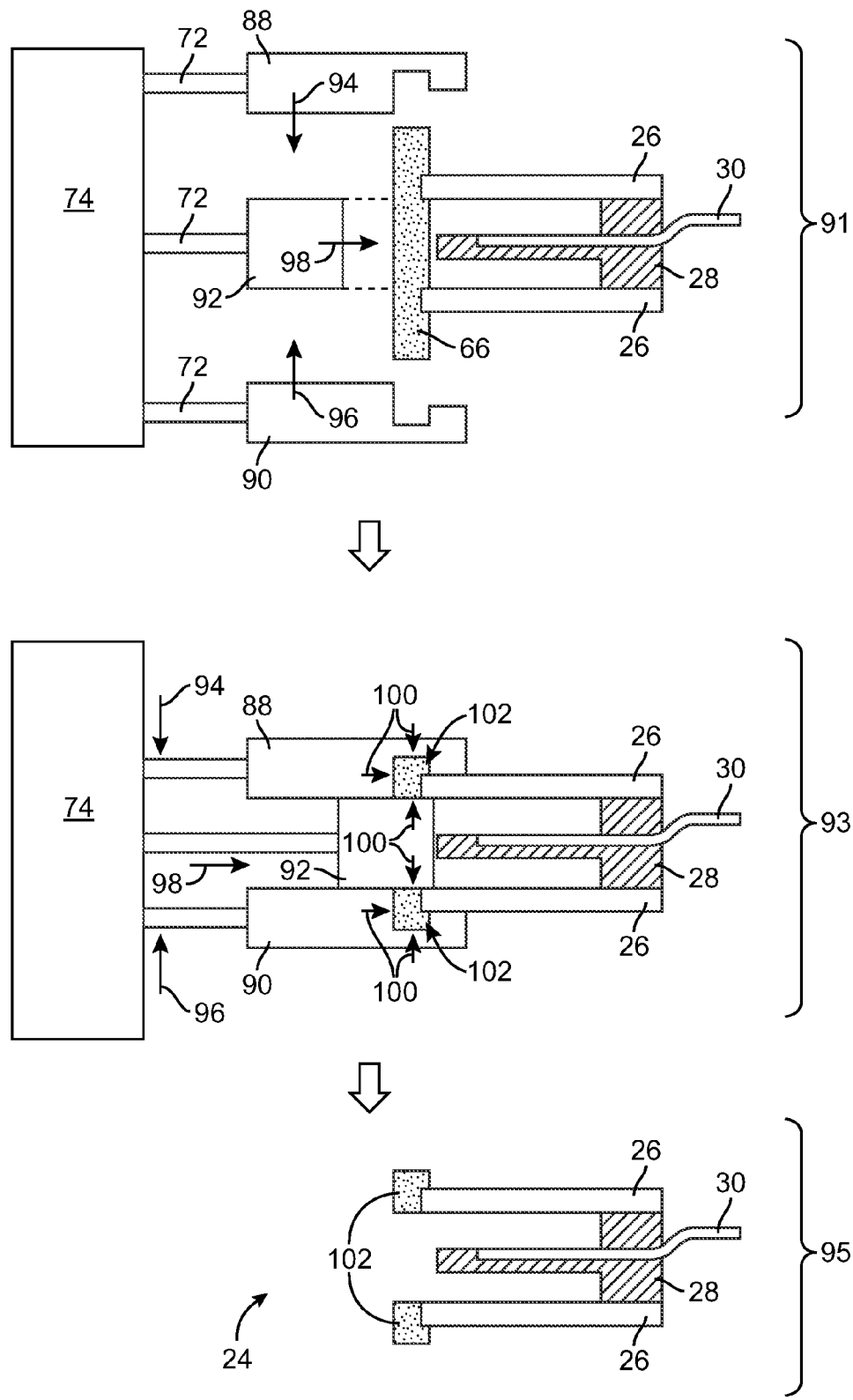
FIG. 9 is a diagram showing how an O-shaped gasket may be formed using a compression molding tool in accordance with an embodiment of the present invention.

Another suitable elastomeric sealing structure that may be used to moisture-seal connector 24 is gasket 102. An elastomeric sealing structure such as O-shaped gasket 102 may be formed using the compression molding process, as shown in FIG. 9. At step 91, an elastomeric layer such as layer 66 may be attached to a front face of metal shell 26. Upper molding structure 88, middle molding structure 92, and lower molding structure 90 may each be connected to control structure 74 through support members 72. A positioner such as control structure 74 may direct the upper, middle, and lower molding structures to move in the directions of arrows 94, 98, and 96, respectively (e.g., by controlling support members 72).

At step 93, the upper molding structure may be lowered until it comes into contact with the top plate of metal shell 26, the lower molding structure may be raised until it comes into contact with the bottom plate of shell 26, and the middle molding structure may be pushed until it comes into contact with plastic contact housing 28. Pushing structure 92 in the direction of arrow 98 way may remove a center portion of layer 66 to form a substantially rectangular ring (O-shaped) gasket such as gasket 102. Molding structures 88, 90, and 92 may be used to compressively mold gasket 102 in the directions of arrows 100. Gasket 102 may be formed and molded directly onto shell 26 without requiring an additional assembly step. Gasket 102 may retain its molded shape after molding and may remain attached to shell 26 upon release of the molding structures (step 95).

Figure 10:
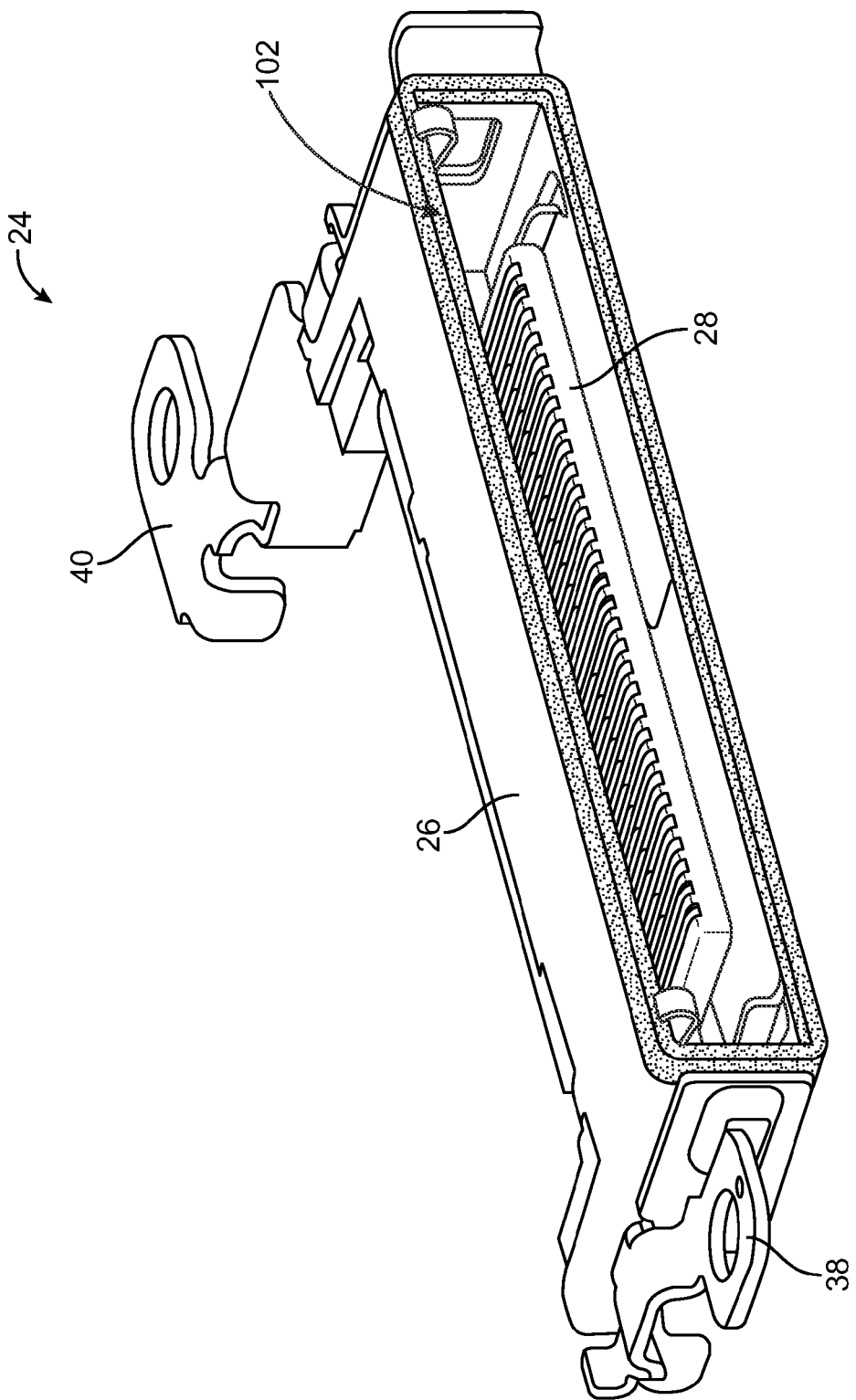
FIG. 10 is a perspective view of an illustrative sealed connector that is moisture-sealed with an O-shaped gasket of the type shown in FIG. 9 in accordance with an embodiment of the present invention.

Gasket 102 may create a seal along all four edges of metal shell 26, as shown in FIG. 10. PSA need not be necessary with this type of configuration, because the bottom edge of shell 26 can be effectively sealed by gasket 102. If desired, PSA may be applied to the bottom of connector 24 to provide additional sealing capabilities.

Figure 11:
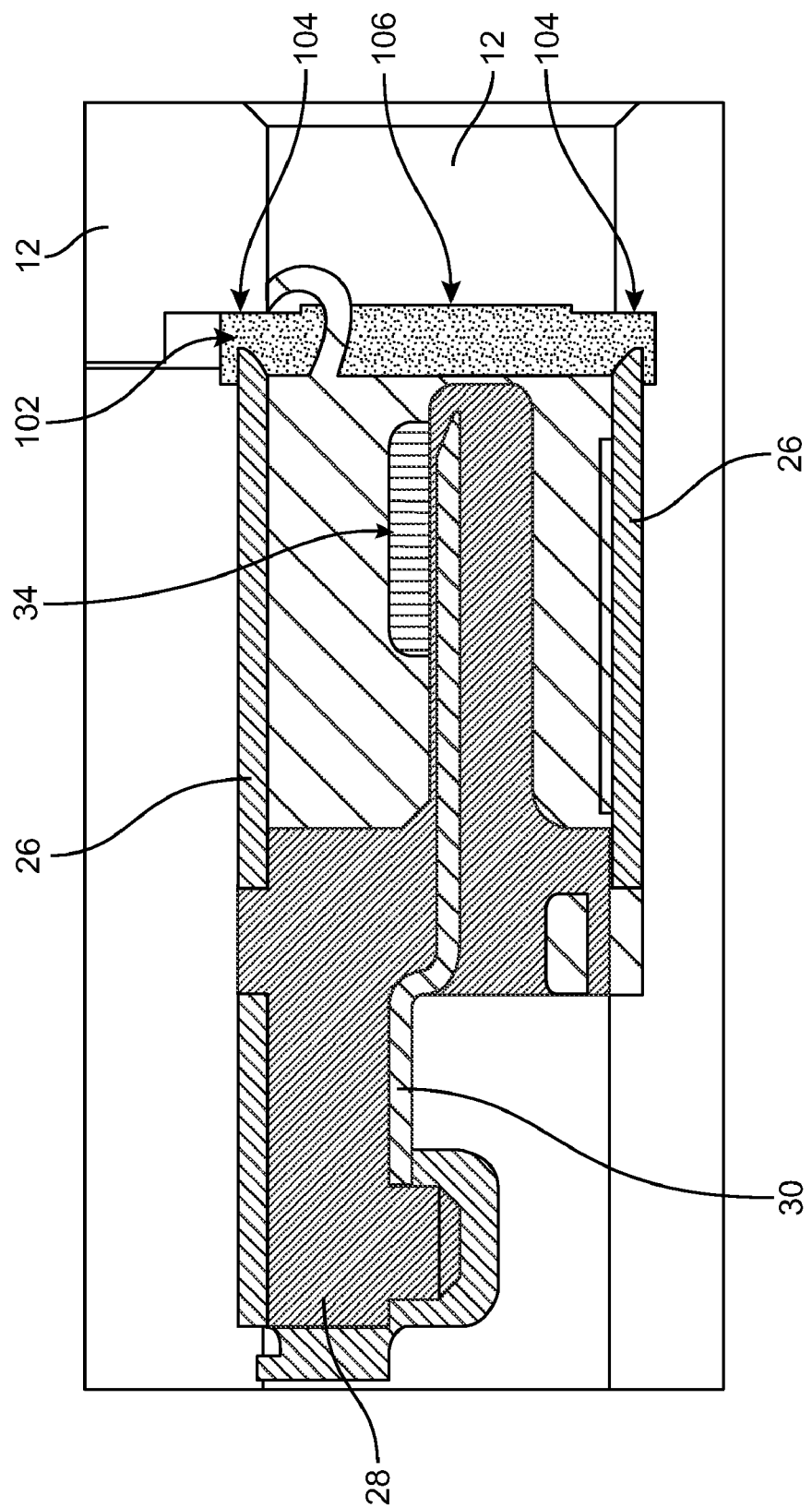
FIG. 11 is a cross-sectional side view of the illustrative sealed connector of FIG. 10 in accordance with an embodiment of the present invention.

FIG. 11 is a cross-sectional side view showing sealed connector 24 mounted within housing 12. Top and bottom portions of gasket 102 that line the top and bottom edges of shell 26 may be pushed against corresponding surfaces 104 of device housing 12 to compress gasket 102 between the connector and the device housing. Side portions of gasket 102 that line the two sides of shell 26 may be pushed against corresponding surfaces 106 of device housing 12 to compress gasket 102. In the compressed state, gasket 80 may seal the shell-to-housing gaps to prevent moisture from entering the housing. Sealed connector 24 may be secured by screws 44 to circuit board 42 (see, e.g., FIG. 7) mounted within housing 12 when gasket 102 is in the compressed state.

Figure 12:
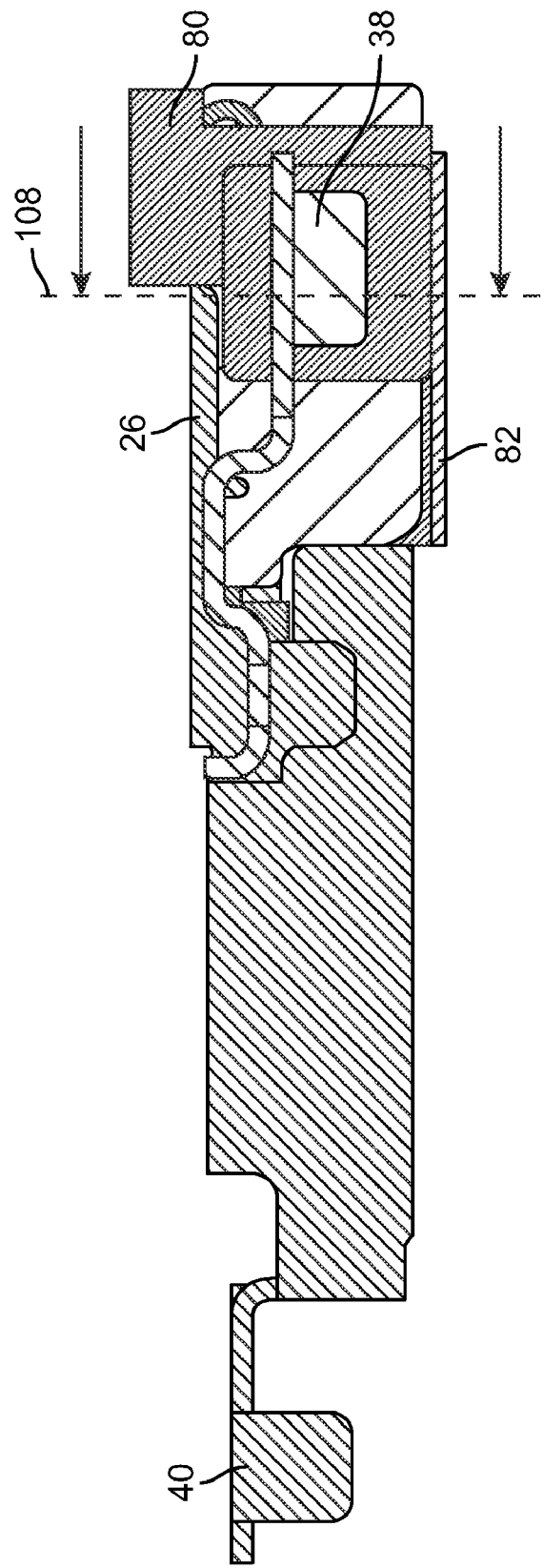
FIG. 12 is a cross-sectional side view of an illustrative sealed connector that is moisture-sealed with a metal bracket and an elastomeric sealing member in accordance with an embodiment of the present invention.

Other potential high-risk ingress areas include latch windows 34 (described in connection with FIG. 2). FIG. 12 is a side view of sealed connector 24 as viewed from the side of connector 24 that faces left bracket 38. Connector 24 of FIG. 12 includes gasket 80 assembled onto metal shell 26. Dotted line 108 represents a cross-sectional cut across connector 24. Line 108 is drawn directly over left bracket 38.

Figure 13:
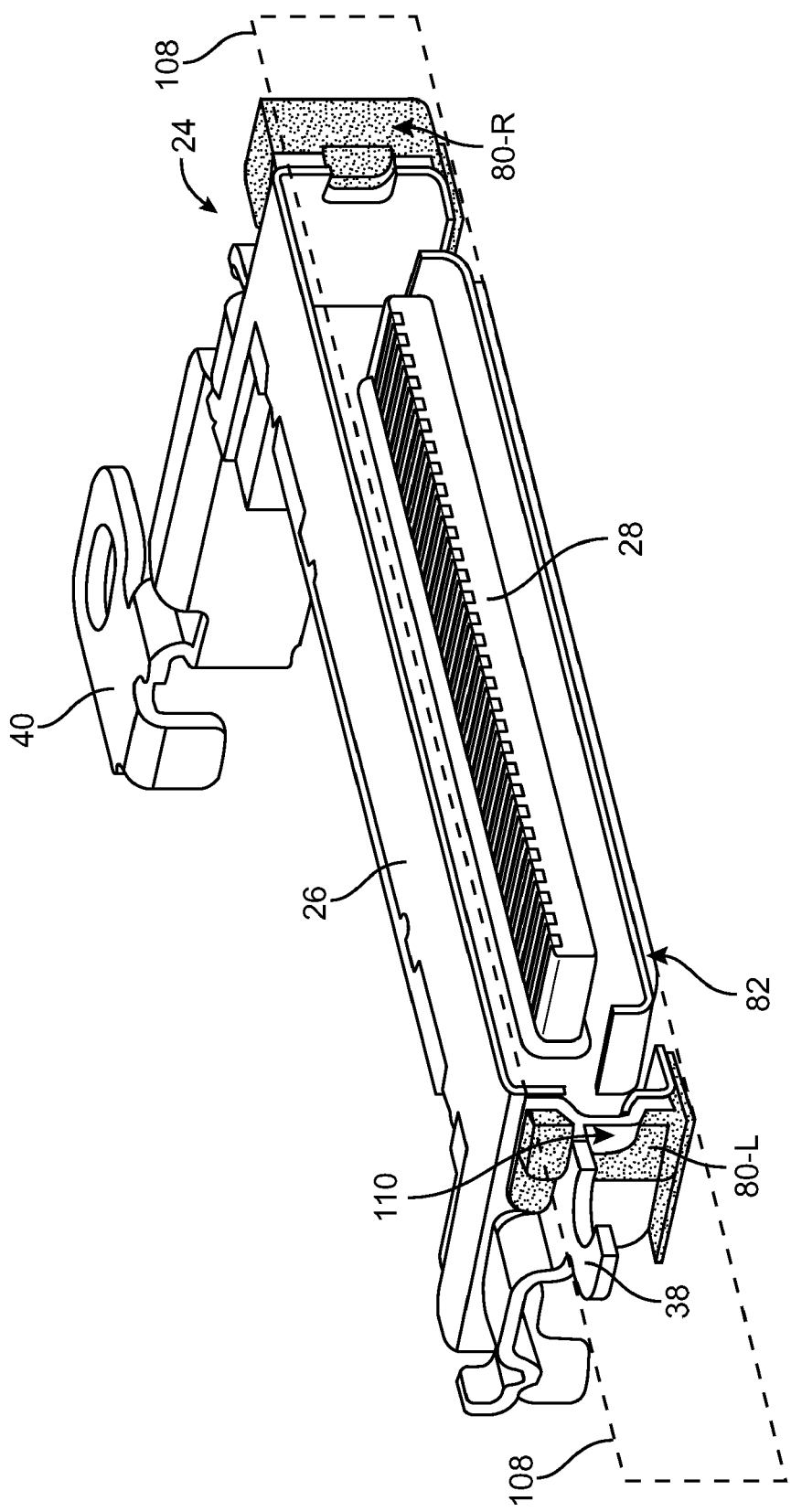
FIG. 13 is a perspective view of the illustrative sealed connector of FIG. 12 in accordance with an embodiment of the present invention.

FIG. 13 is a perspective view of the sealed connector of FIG. 12 sectioned along a cross-sectional cut on plane 108. Left metal bracket 38 may have a sealed protruding portion such as portion 110 that forms a cup that seals the left latch window. Left metal bracket 38 may be welded to metal shell 26 to form a chemical bond. Chemical bonds may be formed between two similar types of materials (e.g., metal with metal or plastic with plastic). Chemical bonds tend to be stronger and even less likely to leak than mechanical bonds. Cup 110 is recessed sufficiently to accommodate the latches on the male plug while also sealing the left latch window.

The right latch window may be sealed by an elastomeric sealing member such as elastomeric sealing member 80-R. Sealing member 80-R may sometimes be referred to as a silicone boot. As with protrusion 110, sealing member 80-R may form a cup that receives the latches on the male plug while also sealing the right latch window. Sealing member 80-R may be formed as part of a gasket of the type described in connection gasket 80 of FIG. 7.

These techniques to seal the latch windows are merely illustrative. If desired, the right latch window may be sealed by a metal bracket with a latch receiving cup or the left latch window may be sealed by an elastomeric sealing member such as elastomeric sealing member 80-L (which may also be formed as part of gasket 80). In general, metal brackets having latch receiving cups and/or silicone boots may be used to seal latch windows 34.

Figure 14:
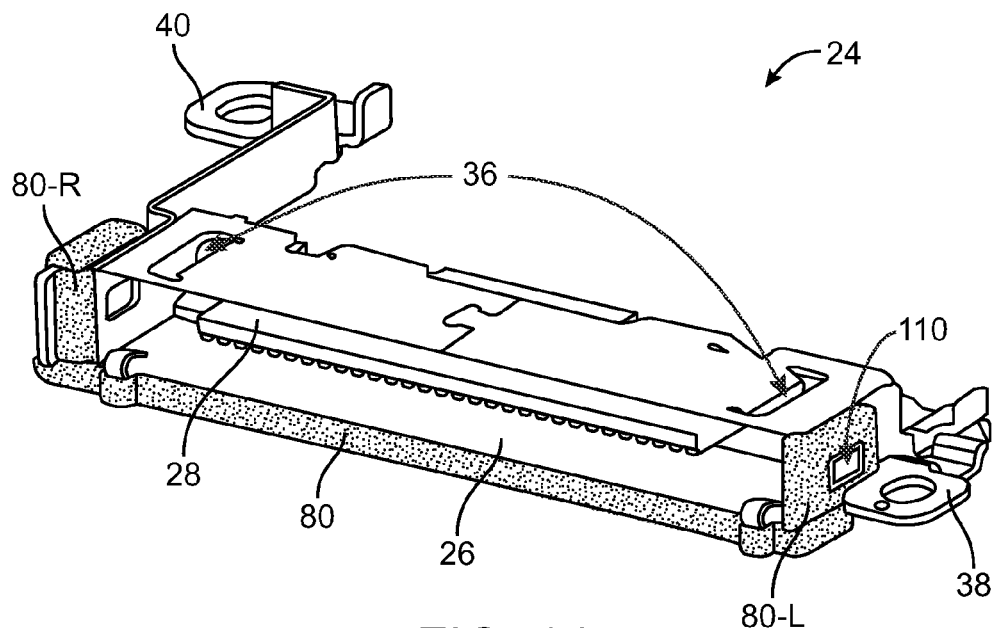
FIG. 14 is a bottom perspective view of an illustrative sealed connector with exposed alignment rail windows in accordance with an embodiment of the present invention.

Alignment rail windows 36 described in connection with FIG. 2 may present another high-risk area for moisture ingress. FIG. 14 is a bottom perspective view of sealed connector 24 showing the alignment rail windows. Alignment rail windows 36 are created as a byproduct of a shell stamping process that is used to form alignment rails 37 (see, e.g., FIG. 2). The alignment rails are raised up from the bottom plate of shell 26, and the rail windows are formed as a remainder of this process. As shown in FIG. 14, silicone boot 80-L and 80-R may be integral portions of gasket 80.

Figure 15:
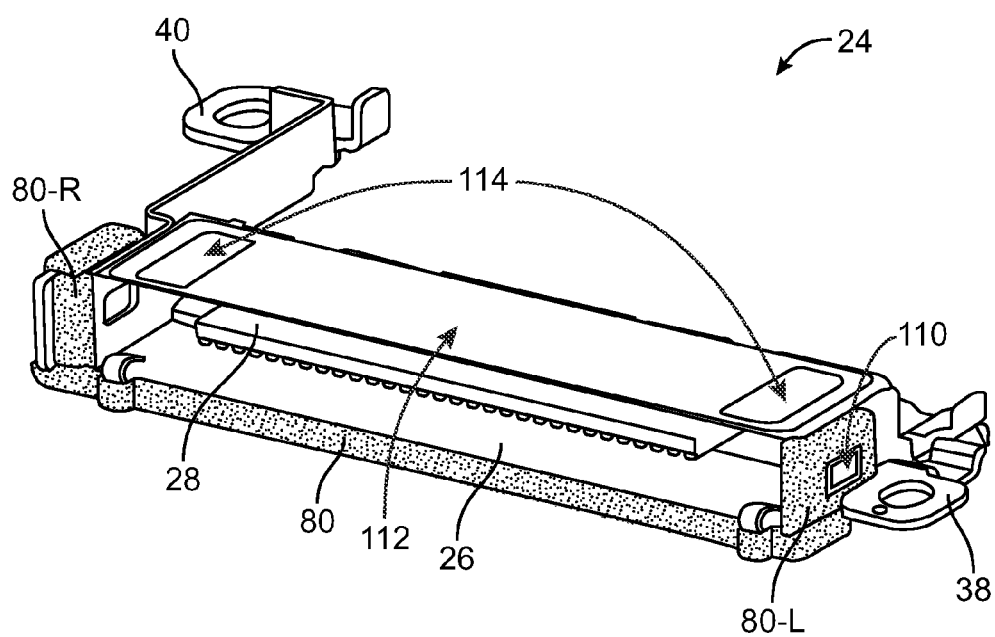
FIG. 15 is a bottom perspective view of an illustrative sealed connector with a water-resistant sealing layer in accordance with an embodiment of the present invention.

To prevent moisture from entering device 10 through the alignment rail windows, a water-resistant sealing layer such as water-resistant mylar film 112 may be used to cover the bottom plate of shell 26, as shown in FIG. 15. Other water-resistant materials may be used to seal window openings 36, if desired. A layer of adhesive may be formed between the bottom plate of shell 26 and film 112 to adhere film 112 to shell 26. Adhesive is preferably not applied at regions 114 that correspond to the rail window openings, because it is generally undesirable to expose an adhesive surface to an environment that is external to the device.

Sealed connector 24 may be moisture-sealed using any desired combination of the various techniques described in connection with FIGS. 1-15. In particular, insert molding techniques may be used to seal the contact stitching gaps and the shell-to-insulator gaps, silicone gaskets (e.g., gasket 80 or gasket 102) may be used to seal shell-to-housing gaps 32, welded metal brackets and/or elastomeric sealing members may be used to seal the latch windows, and a water-resistant sealing film may be used to seal the alignment rail windows. Any sub-combination of these techniques may be used to moisture-seal connector 24 as desired.

For example, consider a scenario in which the high risk areas for liquid ingress include the shell-to-housing gaps, the latch windows, and the alignment rail windows. Sealed connector 24 in this scenario may be formed using silicone gasket 102 of the type described in connection with FIG. 10 (as an example). Sealed connector 24 may have left metal bracket 110 and right sealing member 80-R to seal the latch windows and may have water-resistant mylar film 112 to seal the alignment rail windows. The plastic contact housing within metal shell 26 may be formed using insert-molding, if desired.

Consider another scenario in which the high risk areas for liquid ingress include the shell-to-insulator gaps, the shell-to-housing gaps, and the latch windows. Sealed connector 24 in this scenario may be formed using the insert-molding process described in connection with FIG. 3 or FIG. 4 (as examples). Sealed connector 24 may be formed using silicone gasket 80 of the type described in connection with FIG. 7 (as an example). Sealed connector 24 may have left and right elastomeric sealing members 80-L and 80-R (e.g., as integral parts of silicone gasket 80) that are used to seal the latch windows.

The foregoing is merely illustrative of the principles of this invention and various modifications can be made by those skilled in the art without departing from the scope and spirit of the invention.

What is claimed is:

1. A connector, comprising:
  a metal shell, wherein the metal shell has top and bottom plates that are connected by left and right side portions, wherein the left side portion has a left latch hole, and wherein the right side portion has a right latch hole; and
  left and right sealing structures that are attached respectively to the left and right side portions, wherein the left and right sealing structures each have a protruding portion that forms a cup and wherein the left and right sealing structures respectively moisture-seal the left and right latch holes.

2. The connector defined in claim 1, wherein the left sealing structure comprises a metal bracket that is welded to the metal shell and wherein the right sealing structure comprises an elastomeric sealing member.

3. The connector defined in claim 1, wherein the left and right sealing structures comprise metal brackets that are welded to the metal shell.

4. The connector defined in claim 3, wherein the metal brackets have screw holes.

5. The connector defined in claim 1, wherein the left and right sealing structures comprise elastomeric sealing members.

6. The connector defined in claim 5, wherein the left and right sealing structures form integral parts of an elastomeric gasket that covers the top plate and the left and right side portions of the metal shell.

7. The connector defined in claim 6, further comprising a layer of pressure sensitive adhesive on the bottom plate of the metal shell.

8. The connector defined in claim 1, further comprising:
  a substantially rectangular compression molded gasket on the metal shell.

9. A connector, comprising:
  a metal shell having top and bottom plates that are connected by left and right side portions, wherein the bottom plate of the metal shell has at least one through-hole; and
  a flexible sheet of polymer attached to the bottom plate that moisture-seals the at least one through-hole.

10. The connector defined in claim 9, wherein the flexible sheet of polymer comprises a mylar film.

11. The connector defined in claim 9, further comprising adhesive between the bottom plate of the metal shell and the flexible sheet of polymer.

12. The connector defined in claim 9, wherein the left side portion has a left latch window and wherein the right side portion has a right latch window.

13. The connector defined in claim 12 further comprising a metal bracket and an elastomeric sealing member each having a protruding portion that forms a cup, wherein the metal bracket and the elastomeric sealing member respectively moisture-seal the left and right latch windows.

14. The connector defined in claim 9 further comprising:
  a substantially rectangular compression molded gasket on the metal shell.

15. A connector comprising:
  a metal shell;
  an insert molded plastic contact housing within the metal shell;
  a plurality of conductive signal contacts that are insert molded into the plastic contact housing, wherein a left side portion of the metal shell has a left latch hole and wherein a right side portion of the metal shell has a right latch hole; and left and right sealing structures that are attached respectively to the left and right side portions, wherein the left and right sealing structures each have a protruding portion that forms a cup and wherein the left and right sealing structures respectively moisture-seal the left and right latch holes.

16. The connector defined in claim 15, wherein the insert molded plastic contact housing includes reverse mating structures at the corners of the metal shell and wherein the reverse mating structures prevent insertion of improperly oriented mating plugs into the connector.

17. The connector defined in claim 15, wherein the metal shell has top and bottom plates and wherein the left and right side portions are each connected between the top and bottom plates.

18. The connector defined in claim 17, wherein the bottom plate of the metal shell has alignment rails and alignment rail windows adjacent to the alignment rails, the connector further comprising:

a sheet of polymer attached to the bottom plate that moisture-seals the alignment rail windows.

* * * * *